(12) United States Patent
Rastegar

(10) Patent No.: US 10,814,998 B2
(45) Date of Patent: Oct. 27, 2020

(54) NON-GPS METHODS AND DEVICES FOR REFUELING REMOTELY PILOTED AIRCRAFT

(71) Applicant: Jahangir S Rastegar, Stony Brook, NY (US)

(72) Inventor: Jahangir S Rastegar, Stony Brook, NY (US)

(73) Assignee: OMNITEK PARTNERS LLC, Ronkonkoma, NY (US)

(*) Notice: Subject to any disclaimer, the term of this patent is extended or adjusted under 35 U.S.C. 154(b) by 414 days.

(21) Appl. No.: 15/912,528

(22) Filed: Mar. 5, 2018

(65) Prior Publication Data

US 2018/0251229 A1   Sep. 6, 2018

Related U.S. Application Data

(60) Provisional application No. 62/467,791, filed on Mar. 6, 2017.

(51) Int. Cl.
*B64D 39/00* (2006.01)
*B64C 39/02* (2006.01)

(52) U.S. Cl.
CPC ........... *B64D 39/00* (2013.01); *B64C 39/024* (2013.01); *B64C 2201/063* (2013.01); *B64C 2201/14* (2013.01)

(58) Field of Classification Search
CPC . B64D 39/00; B64C 2201/063; B64C 39/024; B64C 2201/14
USPC .................................................. 244/135 A
See application file for complete search history.

(56) References Cited

U.S. PATENT DOCUMENTS

| | | | | |
|---|---|---|---|---|
| 2,993,997 A * | 7/1961 | McFarlane | ............ | F41G 7/2293 356/141.3 |
| 4,025,193 A * | 5/1977 | Pond | ...................... | B64D 39/00 356/5.1 |
| 4,298,176 A * | 11/1981 | Kendall | ................. | B64D 39/00 244/135 A |
| 4,763,861 A * | 8/1988 | Newman | ................ | B64D 39/00 244/135 A |
| 6,269,763 B1 * | 8/2001 | Woodland | .............. | A62C 29/00 114/144 A |
| 6,669,145 B1 * | 12/2003 | Green | .................... | B64D 39/00 244/135 A |
| 6,889,941 B1 * | 5/2005 | McElreath | ............ | B64C 39/024 244/135 A |
| 6,960,750 B2 * | 11/2005 | Doane | .................... | G02B 5/124 244/135 A |
| 8,010,287 B1 * | 8/2011 | Frank | ..................... | B64D 39/00 701/470 |

(Continued)

FOREIGN PATENT DOCUMENTS

EP   2453331 A1 *   5/2012   ........... G08G 5/0052

*Primary Examiner* — Christopher P Ellis

(57) ABSTRACT

A method for remotely guiding a refueling boom of a tanker to engage with a fueling receptacle of an aircraft while the tanker and the aircraft are in flight. The method comprising: transmitting a polarized RF scanning pattern from one of the refueling boom and refueling receptacle; detecting the polarized RF scanning pattern at one or more cavity sensors disposed on the other of the refueling boom and the refueling receptacle; and controlling a position of the refueling boom relative to a position of the refueling receptacle based on the detected polarized RF scanning pattern at the one or more cavity sensors.

10 Claims, 5 Drawing Sheets

(56) References Cited

U.S. PATENT DOCUMENTS

| | | | | |
|---|---|---|---|---|
| 9,049,740 B1* | 6/2015 | Tillotson | ............... | H04W 88/04 |
| 2007/0023574 A1* | 2/2007 | von Thal | ............... | B64D 39/00 |
| | | | | 244/135 A |
| 2009/0045290 A1* | 2/2009 | Small | ..................... | B64D 39/04 |
| | | | | 244/135 A |
| 2010/0217526 A1* | 8/2010 | McElveen | ............... | G05D 1/104 |
| | | | | 701/300 |
| 2011/0147528 A1* | 6/2011 | Adarve Lozano | ..... | B64D 39/00 |
| | | | | 244/135 A |
| 2012/0059536 A1* | 3/2012 | Pepicelli | ................ | B64D 39/00 |
| | | | | 701/11 |
| 2013/0068889 A1* | 3/2013 | Richardson | ............ | B64D 39/04 |
| | | | | 244/135 A |
| 2013/0168497 A1* | 7/2013 | Rix | ..................... | G05D 1/0094 |
| | | | | 244/135 A |
| 2014/0353429 A1* | 12/2014 | Lopez | .................... | B64D 39/06 |
| | | | | 244/135 A |
| 2015/0293225 A1* | 10/2015 | Riley | ..................... | G01S 17/88 |
| | | | | 356/4.01 |
| 2016/0050011 A1* | 2/2016 | Frolov | ............... | H04B 7/18506 |
| | | | | 455/431 |
| 2017/0136887 A1* | 5/2017 | Ricci | ...................... | B60L 53/63 |
| 2017/0136904 A1* | 5/2017 | Ricci | ...................... | B60L 53/126 |
| 2017/0285627 A1* | 10/2017 | Feldmann | ............. | B64C 39/024 |
| 2018/0164436 A1* | 6/2018 | Johnson | ................ | B64D 39/00 |
| 2018/0173246 A1* | 6/2018 | Crockett | ................ | B64D 39/06 |
| 2018/0210466 A1* | 7/2018 | Weaver | .................... | G08G 5/00 |
| 2018/0356907 A1* | 12/2018 | Parazynski | ............ | A61B 34/70 |
| 2019/0018417 A1* | 1/2019 | Tillotson | .............. | G05D 1/0202 |
| 2019/0031347 A1* | 1/2019 | Duan | ........................ | G06T 7/90 |
| 2019/0092486 A1* | 3/2019 | Jacobus | ................. | B64D 39/04 |
| 2019/0315479 A1* | 10/2019 | Tillotson | ................ | B60L 53/37 |

* cited by examiner

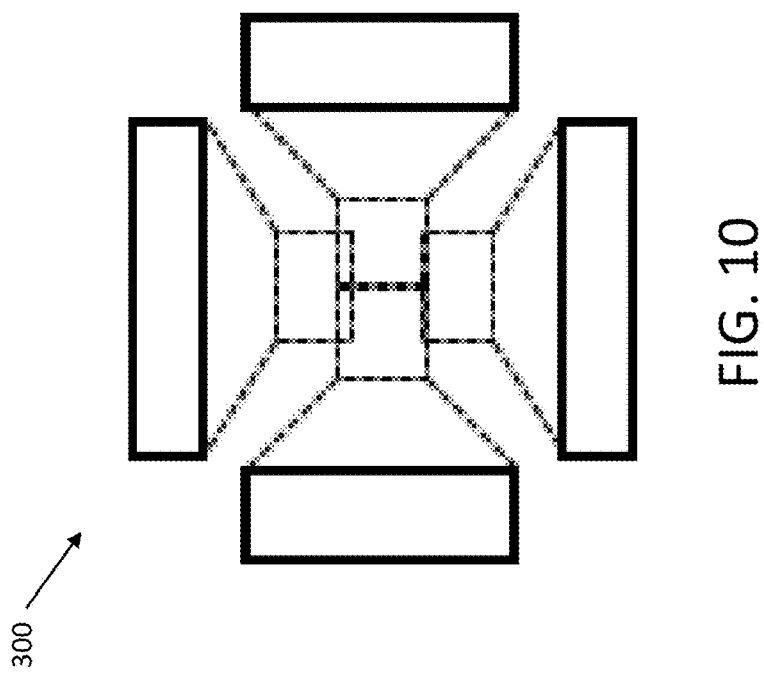
FIG. 10
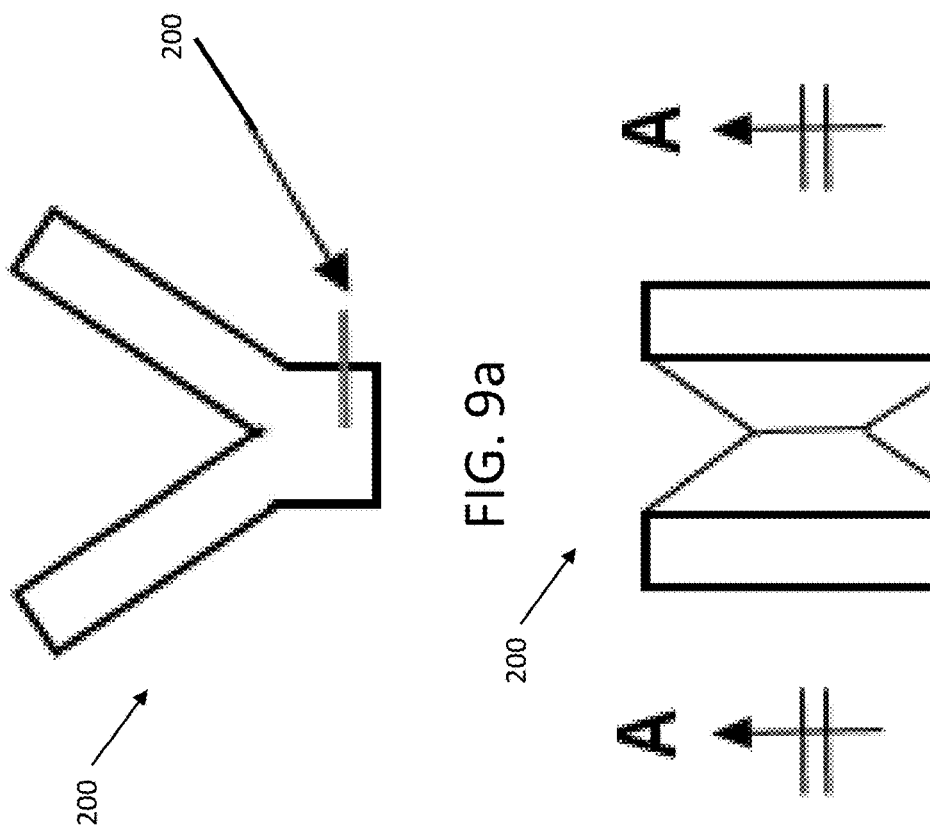
FIG. 9a
FIG. 9b

NON-GPS METHODS AND DEVICES FOR REFUELING REMOTELY PILOTED AIRCRAFT

CROSS-REFERENCE TO RELATED APPLICATION

This application claims the benefit of U.S. Provisional Application No. 62/467,791 filed on Mar. 6, 2017, the entire contents of which is incorporated herein by reference.

BACKGROUND OF THE INVENTION

1. Field of the Invention

The present invention relates generally to methods and devices for refueling remotely piloted aircraft (RPA), and more particularly to a polarized RF sensory system (PRFSS) for refueling of remotely piloted aircraft in an environment where a GPS signal may be unavailable due to signal jamming or satellite disruption.

2. Prior Art

Unlike most United States Air Force (USAF) aircraft types which are provided with aerial refueling capability, the USAF remotely piloted aircraft (RPA) such as Predators, Reapers, and Global Hawks were designed to be low speed, small payload and long-endurance aircraft that can accomplish their missions without refueling. Future RPAs will likely need speed, stealth, and payloads to achieve their missions and would not be able to use current long-endurance planforms.

Today, well-trained receiver pilots maintain relative navigation (RelNav) with the tanker using their vision and cues from the air refueling operator. In recent demonstrations, AFRL's automated aerial refueling (AAR) boom/receptacle and NAVAIR's Unmanned Combat Air Systems (UCAS) probe/drogue programs demonstrated how differential GPS RelNav systems could guide an RPA to the contact position. Differential GPS was selected for these programs both for the technical maturity of the technique, which were developed extensively in the late 90s and early 2000s for landing systems, and for the safety metrics that could be generated and monitored in real-time.

A problem with differential GPS is its dependence on the GPS signal. A tanker/receiver pair could be impacted by local jamming or a disruption in the GPS satellite constellation. A relative navigation solution that is organic to the two aircraft would be preferable, but would need to produce results comparable to the differential GPS technology. Electro-optical/infrared (EO/IR) vision systems, laser systems, and datalink ranging have been considered for non-GPS relative navigation, but no system has established itself as the solution to the problem.

There is therefore a need for non-GPS RelNav system for RPA refueling. The system could be hosted on the tanker, receiver or split across aircraft. Size, weight, power, communications, antenna and aperture requirements are also relevant in evaluating systems.

SUMMARY OF THE INVENTION

The present methods and devices for refueling of remotely piloted aircraft (RPA) is based on "Polarized RF Sensory System" technology. The resulting relative navigation technology does not use a GPS signal and is ideal for refueling of remotely piloted aircraft (RPA) with and without an air refueling operator in the loop by directly providing a differential sensory signal for guiding an RPA to the contact position and boom and receptacle alignment and engagement. Such methods and devices comprises a "Polarized RF Scanning Reference Source" and properly designed "Sensor Cavities." The "Sensor Cavities" can be configured for maximum sensitivity to orientation relative to the direction of the transmitted polarization plane of the scanning reference source.

The "Polarized RF Sensory System" provides full and direct angular orientation and position onboard munitions in the reference coordinate system of the "Polarized RF Scanning Reference Sources," which may be stationary on the ground or mobile. The use of short duration (pulsed) transmitted scanning patterns that are known to the receiving cavity sensor makes the power requirement very low at distances of tens of miles and the required signal-to-noise ratio close to or even below one. The use of pulsed patterns and the polarized nature of the transmitted signal makes it almost impossible to jam or spoof. The scanning pattern may also be instantly changed to make it even harder to jam or spoof.

The "Polarized RF Sensory System" (PRFSS) is particularly suitable for a relative navigation system for refueling of remotely piloted aircraft (RPA). The PRFSS may be configured in several configurations to provide a differential sensory signal for guiding an RPA to the contact position and boom and receptacle alignment and engagement. One embodiment comprises a differential sensory system using a single "Polarized RF Scanning Reference Source" with two pairs of cavity sensors for direct measurement of misalignment between the boom and the receptacle and their relative distance. The cavity sensor pairs may, however, be integrated into a single differential sensor as described below for indicating roll, pitch and yaw misalignment as well as relative distance between the boom and the receptacle during refueling operation with or without a man in the loop.

Features of the disclosed embodiments include:

1. The differential sensory system provides a signal that is directly proportional to the roll, pitch and yaw angle misalignment between the boom and the receptacle as well as their relative distance, which can be used for guiding an RPA to the contact position and boom and receptacle alignment and engagement.

2. The sensory system uses a fully electronic Scanning RF Polarized Reference Source and cavity sensors designed for differential measurement of angular (roll, pitch and yaw) misalignment between the boom and the receptacle and their relative distance.

3. The required cavity sensors can be integrated into a single cavity sensor with appropriate geometry to provide a measure of roll, pitch and yaw misalignment from a single pick-up terminal with a second pick-up terminal to provide for distance measurement.

4. With the single integrated cavity sensor described herein, the system can provide a measure of orientation misalignment and distance between the boom and the receptacle for manned or automated refueling system to achieve their controlled engagement.

5. The "error" signal corresponding to angular misalignment and relative distance between the boom and the receptacle becomes stronger and its accuracy is increased as the boom and receptacle engagement position is approached.

6. The Scanning RF Polarized Reference Source can use a narrow band source with directional and polarized pulsed waves. This combination and the known pattern nature of the transmitted signal reduces the required source power by orders of magnitudes as compared to omnidirectional and continuous transmission systems. For example, the roll angle measurement sensory system working at 10 GHz, has been shown to work reliably even in a very noisy environment, with a reference source output power of 10 dBm and a 20 db horn, with the sensor receiver sensitivity of −70 dBm at a range of 210 meters. The expected operational frequency of 35 GHz significantly reduces the power requirement due to further narrowing of the source band.

7. The known scanning pattern of the Scanning RF Polarized Reference Source allows misalignment measurement at very low signal-to-noise ratios of close to one or lower, and could even allow the signal to be hidden in the environmental noise.

8. The use of pulsed patterns and the polarized nature of the transmitted signal makes it almost impossible to jam or spoof. The scanning pattern may be instantly changed to make it even harder to jam or spoof.

9. The system can be deployed and operated in all weather conditions, including non-line-of-sight conditions.

10. By selecting high operating frequencies, for example around 35 GHz, the size of the sensory system components (transmitting horns and sensor cavities) become very small. The operating frequency can also be selected to make the system completely compatible with other onboard systems. For example, at 35 GHz, a sensor cavity, such as one filled with proper dielectric material, would fit within a few mm cube volume.

11. The Scanning RF Polarized Reference Source can be positioned on the tanker boom while the sensor cavities are positioned on the receptacle—such as a built-in integral part. In operation, the Scanning RF Polarized Reference Source can transmit pulses of prescribed modulated patterns. The sensor cavity receives and calculates the misalignment error and relative distance between the boom and the receptacle. The sensor cavity can then function as a transmitter and transmits the information back to the tanker, for example, for the boom operator to view on a monitor and take corrective action. The information can also be used by the RPA to approach the tanker.

The received misalignment and relative distance error signals can also be used in an automated system control loop for guiding the RPA to the contact position and performing boom and receptacle engagement.

Accordingly, a method is provided for remotely guiding a refueling boom of a tanker to engage with a fueling receptacle of an aircraft while the tanker and the aircraft are in flight, the method comprising: transmitting a polarized RF scanning pattern from one of the refueling boom and refueling receptacle; detecting the polarized RF scanning pattern at one or more cavity sensors disposed on the other of the refueling boom and the refueling receptacle; and controlling a position of the refueling boom relative to a position of the refueling receptacle based on the detected polarized RF scanning pattern at the one or more cavity sensors.

The controlling can comprise determining distance and roll, pitch and yaw angles of the refueling boom relative to the refueling receptacle.

The controlling can be a manual control by a user operating one or more of the refueling boom and refueling receptacle.

The controlling can be an automated control of a position of one or more of the refueling boom and refueling receptacle.

The detecting can comprise detecting the polarized RF scanning pattern at two pairs of individual cavity sensors.

The detecting can comprise detecting the polarized RF scanning pattern at two cavity sensors, each of the two cavity sensors having two cavities offset from each other.

The detecting can comprise detecting the polarized RF scanning pattern at a cavity sensor having four cavities offset from each other.

The transmitting can comprise transmitting the RF scanning pattern hidden in environmental noise.

The method can further comprise, prior to the controlling, transmitting an output of the one or more cavity sensors to the other of the refueling boom and the refueling receptacle.

The method can further comprise detecting engagement of the refueling boom to the refueling receptacle.

BRIEF DESCRIPTION OF THE DRAWINGS

These and other features, aspects, and advantages of the apparatus of the present invention will become better understood with regard to the following description, appended claims, and accompanying drawings where:

FIG. 9a illustrates a frontal view of an integrated pair of differential angular orientation misalignment measuring sensor cavity.

FIG. 9b illustrates a cross-sectional view of the integrated pair of differential angular orientation misalignment measuring sensor cavity of FIG. 9a as viewed along section A-A.

FIG. 10 illustrates a frontal view of an integrated roll, pitch and yaw misalignment measuring sensor cavity.

DETAILED DESCRIPTION OF THE PREFERRED EMBODIMENT

Polarized RF Scanning Reference Source and Geometrical Cavity Sensory System for Full Orientation and Position Measurement The relative navigation technology for a refueling system for remotely piloted aircraft (RPA) is based on "Polarized RF Sensory System" technology. Such technology is not based on a GPS signal.

Figure 1:
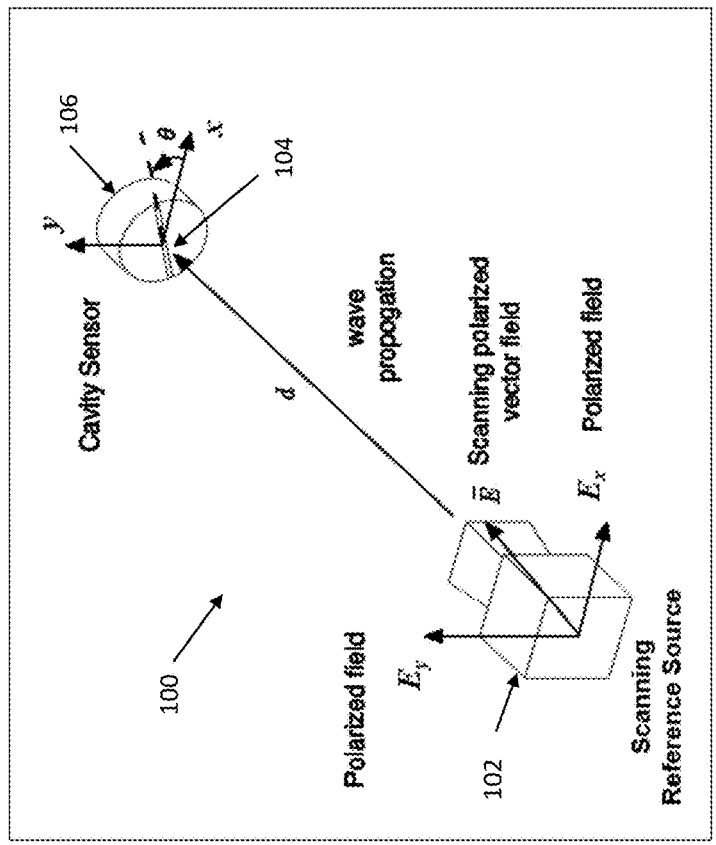
FIG. 1 illustrates a polarized RF angular orientation sensory system for roll angle measurement.

A basic sensory system 100 consists of a scanning polarized RF referencing source (field transmitter) 102 and a receiving geometrical cavity sensor 104 (or cavity sensor for short) as shown in FIG. 1. The design and operation of the system 100 is best described as configured for measuring the roll angle of an object 106 to which the sensor cavity 104 is attached as shown in FIG. 1. In this illustration, the roll angle of the object 106 relative to the scanning reference source 102 is indicated as θ, which indicates the angular orientation of the cavity sensor 104 (and attached object) about the direction of the transmitted wave propagation.

Figure 2:
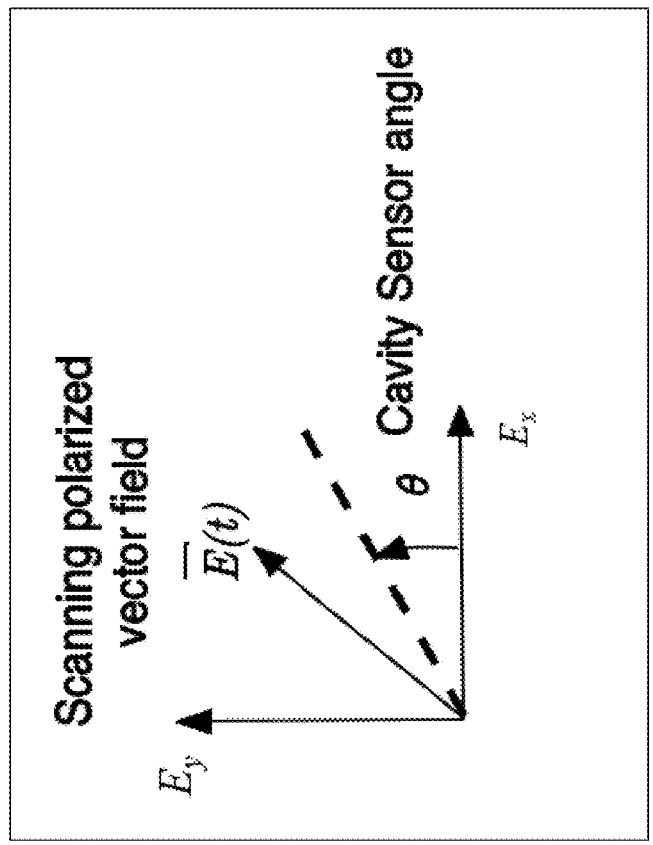
FIG. 2 illustrates a polarized scanning vector and cavity sensor angle.

A Scanning Polarized RF Reference Source, which comprises two polarized RF waves, is based on paradigm shifting concepts. Referring to FIG. 2, by modulating amplitudes of the synchronized and polarized fields $E_x$ and Ey, the referencing source 102 transmits a scanning polarized vector field $\overline{E}(t)$. By properly modulating the two field amplitudes, the desired vector field scanning pattern is obtained. It is noted that $E_x$ and $E_y$ do not have to be orthogonal. In the present configuration of FIG. 1, the (roll) angle to be measured by the sensor 104 is the angle θ as shown in FIGS. 1 and 2.

The field strength detected by the cavity sensor 104 at an angle θ is given by the scalar function R(t) as $$R(t)=g(d)f(\overline{E}(t),\theta) \quad (1)$$

where g(d) is the gain related to the distance d between the scanning reference source 102 and the cavity sensor 104 and environmental factors. Since the time taken to make an angle measurement is very small, changes in the gain g(d) during its measurement are negligible and the gain stays constant.

The mapping function $f(\overline{E}, \theta)$ is determined by the design of the cavity sensor 104 and its calibration. The geometry of the cavity is designed and pick-up terminal are located so as to maximize sensitivity to roll angle and minimize sensitivity to pitch and yaw. Since the angle θ is measured by matching the scanning pattern, the effect of the fixed gain g(d) is eliminated during each angle measurement as described in the following example pattern.

For a properly formulated scanning pattern for the referencing source 102, the roll angle θ is readily extracted from the received signal at the cavity sensor 104 from the measured amplitude pattern of the vector R(t), the known mapping function $f(\overline{E}, \theta)$, and the scanning pattern of the vector $\overline{E}(t)$ as shown in the following example.

A Sample Reference Source Scanning Pattern for Roll Angle Measurement

Consider a scanning vector field $\overline{E}(t)=E_x(t)\hat{i}+E_y(t)\hat{j}$ formed by the orthogonal synchronized polarized electric field signals $E_x(t)$ and $E_y(t)$ shown in FIGS. 1 and 2, and which are modulated as follows $$E_x(t)=a(\cos \omega t+\cos 2\omega t)+b \quad (2)$$

$$E_y(t)=a(\sin \omega t+\sin 3\omega t)+b \quad (3)$$

where ω is the fundamental frequency of both signals, a is a constant signal amplitude and b is the constant that provides a proper amplitude modulation index.

The electric field detected by the cavity sensor 104 will then become $$\begin{aligned} R(t) &= g(d)(E_x(t)\cos\theta + E_y(t)\sin\theta) \quad (4)\\ &= g(d)\{[a(\cos\omega t + \cos 2\omega t) + b]\cos\theta + \\ &\quad [a(\sin\omega t + \sin 3\omega t) + b]\sin\theta\}\\ &= g(d)[a(\cos\omega t\cos\theta + \sin\omega t\sin\theta) + a\cos\theta\cos 2\omega t + \\ &\quad a\sin\theta\sin 3\omega t + b(\sin\theta + \cos\theta)]\\ &= g(d)[a\cos(\omega t - \theta) + a\cos\theta\cos 2\omega t + \\ &\quad a\sin\theta\sin 3\omega t + b(\sin\theta + \cos\theta)] \end{aligned}$$

It is seen from equation (4) that the angle θ can be determined from the phase shifting of the fundamental frequency ω and the zero crossing of the fundamental frequency occurs when the harmonics 2ω and 3ω are in phase. As expected, the gain g(d) does not affect the angle measurement, therefore angle measurement has become independent of position (distance) measurement.

The polarized RF scanning pattern of equations (2) and (3) is shown to have the unique characteristic of yielding the roll angle and time reference through readily detectable fundamental frequency and its first two harmonics. The detection electronics is also made simple and low cost and since the pattern is known to the detection signal processing unit (controller, such as a CPU), the roll angle can be recovered even when the signal-to-noise ratio of the measured RF signal is below unity. In fact, a signal pattern may even be hidden in the environmental noise, making the system immune to all countermeasures. The polarized nature of the scanning pattern along with being transmitted in short and random pulses, makes it almost impossible to jam or spoof.

In addition, high angular precision is possible due to the complex modulation patterns, and mapping of the angular space to the time domain. With off-the-shelf components, time measurement accuracy has been shown to be better than 0.1%. Thus, angle accuracy, which is proportional to time, becomes better than 0.06° for a scan range of +/−30°.

It is also appreciated that other information is also available in the transmitted signal pattern and the received signal that can be used to increase the precision and robustness of the angle measurement. For example, the amplitude of the fundamental frequency can provide distance information or the amplitude of the second and third harmonics are related to the tan(θ), which provides a second measurement for the roll angle.

One feature of the patterns of the type presented in this example is that they provide a reference position angle, which is fixed in the referencing coordinate system of the scanning referencing source. In this case, the time zero occurs when the two harmonics 2ω and 3ω are in phase.

For a cavity sensor 104 that is configured with certain sensitivity to the angle but linear to the amplitude of $\overline{E}$, the mapping function $f(\overline{E}, \theta)$ can be expressed as $$f(\overline{E},\theta)=|\overline{E}|f'(\theta-\angle\overline{E}) \quad (5)$$

Then the electric field detected by this cavity becomes $$\begin{aligned} R(t) &= g(d)\left[E_x(t)f'(\theta) + E_y(t)f'\left(\theta - \frac{\pi}{2}\right)\right] \quad (6)\\ &= g(d)\{[a(\cos\omega t + \cos 2\omega t) + b]f'(\theta) + \\ &\quad [a(\sin \omega t + \sin 3\omega t) + b]\ f'\left(\theta - \frac{\pi}{2}\right)\}\\ &= g(d)\Big[a\Big(\cos\omega t f'\Big(\theta - \frac{\pi}{2}\Big) + \sin\omega t f'(\theta)\Big) + af'\Big(\theta - \frac{\pi}{2}\Big)\cos 2\omega t + \\ &\quad af'(\theta)\sin 3\omega t + b\Big(f'(\theta) + f'\Big(\theta - \frac{\pi}{2}\Big)\Big)\Big]\\ &= g(d)\Bigg[a\sqrt{f'\Big(\theta - \frac{\pi}{2}\Big)^2 + f'(\theta)^2}\ \cos(\omega t - \phi) + af'\Big(\theta - \frac{\pi}{2}\Big)\cos 2\omega t + \\ &\quad af'(\theta)\sin 3\omega t + b\Big(f'(\theta) + f'\Big(\theta - \frac{\pi}{2}\Big)\Big)\Bigg] \end{aligned}$$

where $\phi = \tan^{-1}\dfrac{f'(\theta)}{f'\left(\theta - \frac{\pi}{2}\right)}$.

The angle θ can then be determined from the phase shift ϕ. Similar amplitude relationships define the amplitudes of the frequencies 2ω and 3ω, and the time zero still occurs when the two harmonics 2ω and 3ω are in phase.

Example—Roll Angle Measurement from a Reference Source Scanning Pattern

Figure 3:
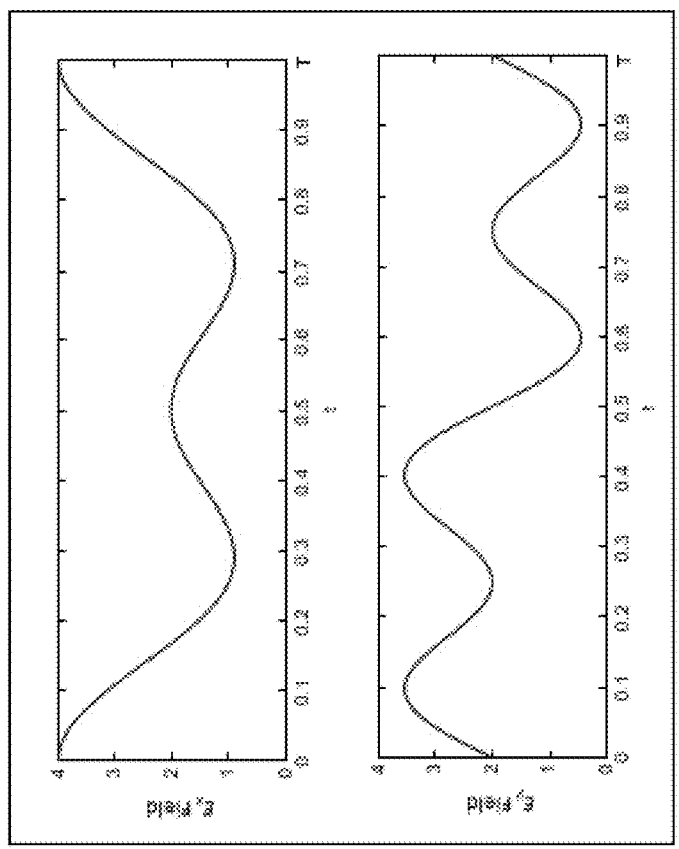
FIG. 3 illustrates a graphical representation of the modulated $E_x$ and $E_y$ patterns.

As an example, in the orthogonal synchronized polarized electric field signals $E_x(t)$ and $E_y(t)$ of equations (2) and (3), let a=1 and b=2. The resulting polarized electric field patterns $E_x(t)$ and $E_x(t)$ are shown in FIG. 3 for a period of the fundamental frequency T.

Figure 4:
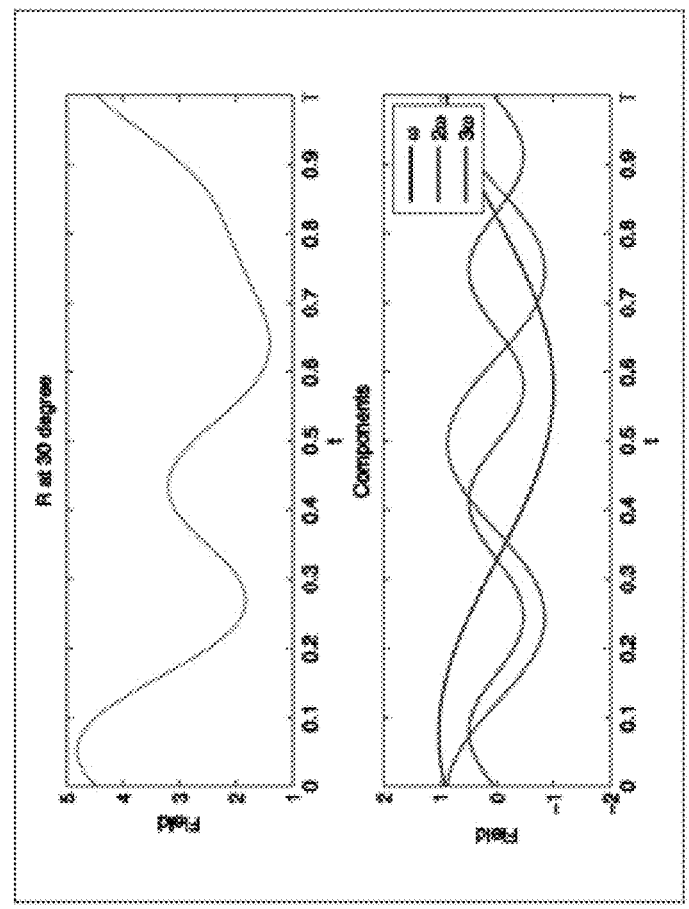
FIG. 4 illustrates a graphical representation of the signal received at 30° and its harmonics.

The roll angle θ can then be measured from the detected signal and its fundamental frequency and first two harmonics. As an example, the amplitude pattern of the vector R(t) and its fundamental frequency ω and its first two harmonics 2ω and 3ω at the roll angle θ=30° are shown in FIG. 4, in which the fundamental frequency can be seen to have shifted π/12 of the period T, corresponding to the roll angle θ=30°. The time zero is when the harmonics 2ω and 3ω are in phase, i.e., at time T/4 (corresponding to the angle π/2).

Polarized RF Geometrical Cavity Orientation Sensors

The cavity orientation sensors 104 are geometrical cavities with one or more pick up terminals that are designed to provide output that varies with orientation of the sensor with respect to the direction of the incoming polarized RF plane of polarization. The cavities are designed for high sensitivity to the desired orientation variation and for relatively low cross-sensitivity.

Figure 5:
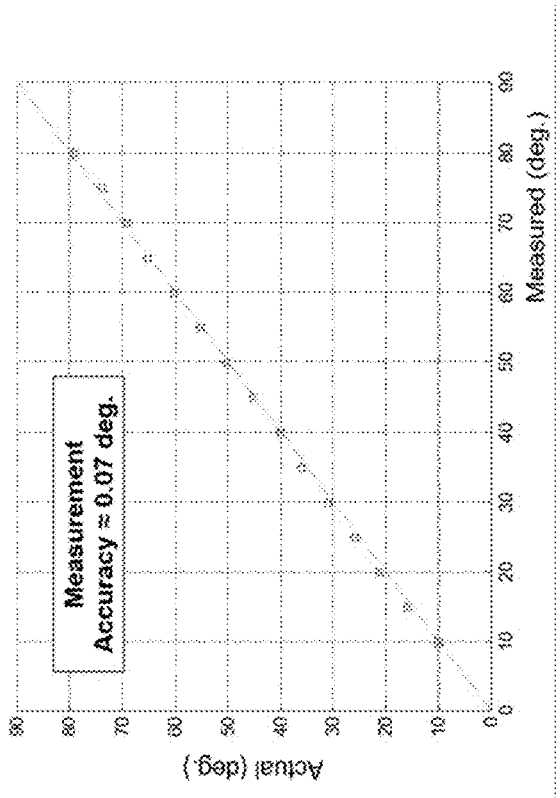
FIG. 5 illustrates a graphical representation of the measured roll angle in the anechoic chamber.

As an example, a cavity sensor was designed to have an asymmetric response in the azimuth plane, with a +/−10 deg. tolerance to elevation misalignment and having an optimally designed cavity sensor for maximum sensitivity and minimal cross-sensitivity with the selected basic geometry. The optimally obtained sensor design has a rectangular cavity defined by a width of 2.25λ a height of 0.15λ and a length of 0.75λ. A dual polarization, 18 dB, horn was used to transmit the two synchronize amplitude modulated linearly polarized RF waves at 10 GHz. The plot of the roll angle measurement of this cavity sensor in an anechoic chamber is shown in FIG. 5, indicating a 0.07 deg. accuracy.

Cavity Sensors for Yaw and Pitch Angle Measurement

Figure 6:
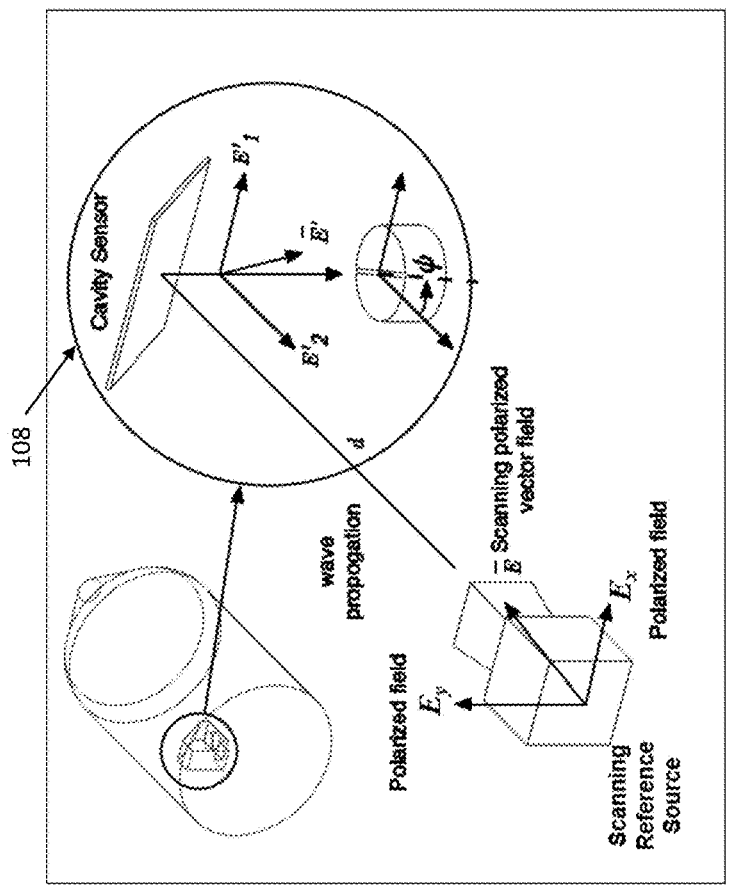
FIG. 6 illustrates a polarized RF angular orientation sensory system yaw (pitch) angle measurement.

To measure the yaw angle, since the yaw angle is measured about an axis that is perpendicular to a vertical plane that is parallel to the direction of wave propagation, the yaw sensor cavities 108 can be configured to act as a reflector, as shown in FIG. 6. Thus, the synchronized and polarized vector fields $E_x$ and $E_y$ are transformed to $E'_1$ and $E'_2$, respectively, and the scanning vector field $\bar{E}$ is transformed to scanning vector filed $\bar{E}'$, which indicates the measured yaw angle ψ. A similar sensor cavity aligned to a perpendicular plane can measure the pitch angle. In munitions applications, since all rounds are designed to spin, one only need to measure roll and alternatively pitch and yaw angles. Up and down resolution is also achieved by providing asymmetrically positioned roll angle sensors.

A cavity sensor that was designed for roll and yaw angle measurement where the cavity sensor was designed through an optimization process for high sensitivity to yaw and minimal cross-sensitivity to pitch angle of +/−5 degrees. The roll angle is independently measured and used together with the roll angle measured in the sensor to eliminate the effect of roll angle cross-sensitivity on the yaw angle measurement. The optimal cavity sensor was obtained using a parametric FE model of the cavity geometry and the propagated polarized RF incoming wave using ANSYS software with added routines.

Polarized RF Sensory System Based Differential Sensory System for Relative Navigation for Refueling of Remotely Piloted Aircrafts A "Polarized RF Sensory System" and its application for roll, yaw and pitch angle measurement was described above. Such an angular orientation sensory system can be readily configured as a differential roll, pitch and yaw angle misalignment sensor for detecting angular misalignment as well as distance (position error) between a tanker refueling boom and a receptacle on an unmanned aircraft (UAV).

Figure 7:
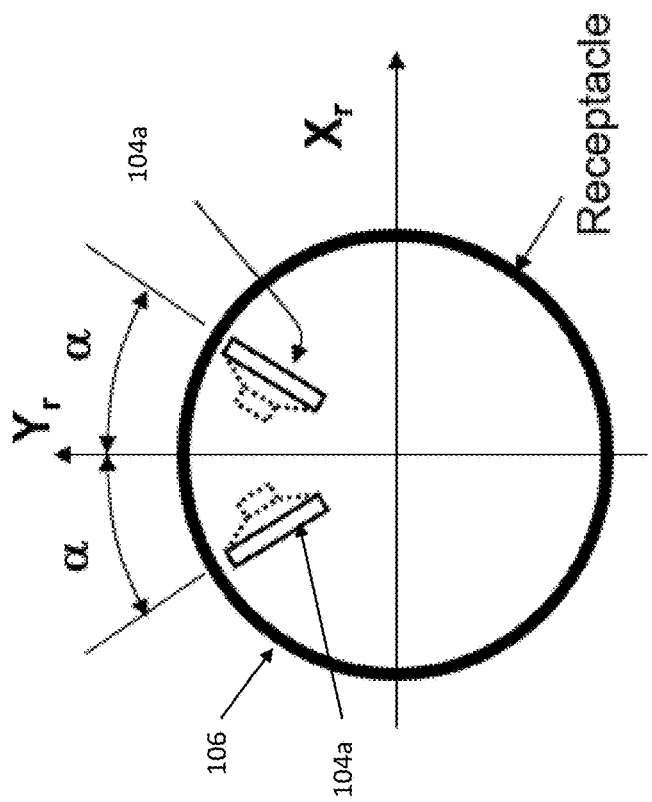
FIG. 7 illustrates a sensor cavity pair for differential measurement of combined roll and yaw angle misalignment between the boom and receptacle.

Consider the polarized RF angular orientation sensory system 100 for roll angle measurement shown in the schematic of FIG. 1. Let the polarized RF scanning reference source 102 be fixed to the tanker refueling boom while the cavity sensors 104 are fixed to the UAV receptacle (the object in FIG. 1) 106, directly facing the scanning reference source 102 on the boom. In addition, instead of a single cavity sensor shown on the rolling object of FIG. 1, a pair of two identical cavity sensors 104a are positioned symmetrically on the receptacle facing the scanning reference source on the boom as shown in FIG. 7. The cavity sensor pair 104a shown in FIG. 7 are "horn" shaped and geometrically designed for maximum sensitivity to roll angle relative to the incoming scanning plane of polarization (the roll angle sensitivity being due to cross-polarization as well as the internal geometry of the sensor cavity). As can be seen in FIG. 7, the sensor cavity pair 104a are also slightly tilted inwards as shown by the dotted lines (a longitudinal axis of the cavity is non-parallel to the Z axis into and out of the Figure). Thus, the cavity sensor pair 104a also have asymmetric sensitivity to rotation about the $Y_r$-axis relative to the boom (yaw angle when the X and $X_r$ axes are parallel).

Now let the polarized RF scanning pattern of the reference source 102 be symmetric about the Y-axis of the reference source. Thus, the differential measurement of the signal received at the cavity sensor pair 104a will be zero only when the roll angle as well as the yaw angle of the receptacle 106 relative to the boom are zero as indicated in the coordinate system of the reference source of FIG. 1. Therefore, the differential output of the cavity sensor pair 104a will be zero only if the X axis of the polarized RF scanning reference source, FIG. 1, is parallel with the $X_r$ axis of the receptacle 106, FIG. 7, and the Y-Z and $Y_r$-$Z_r$ planes are parallel, i.e., the receptacle 106 has zero roll and yaw angles relative to the boom but may have a pitch angle relative to the boom. The distance between the Y-Z and $Y_r$-$Z_r$ planes may also be non-zero.

Figure 8:
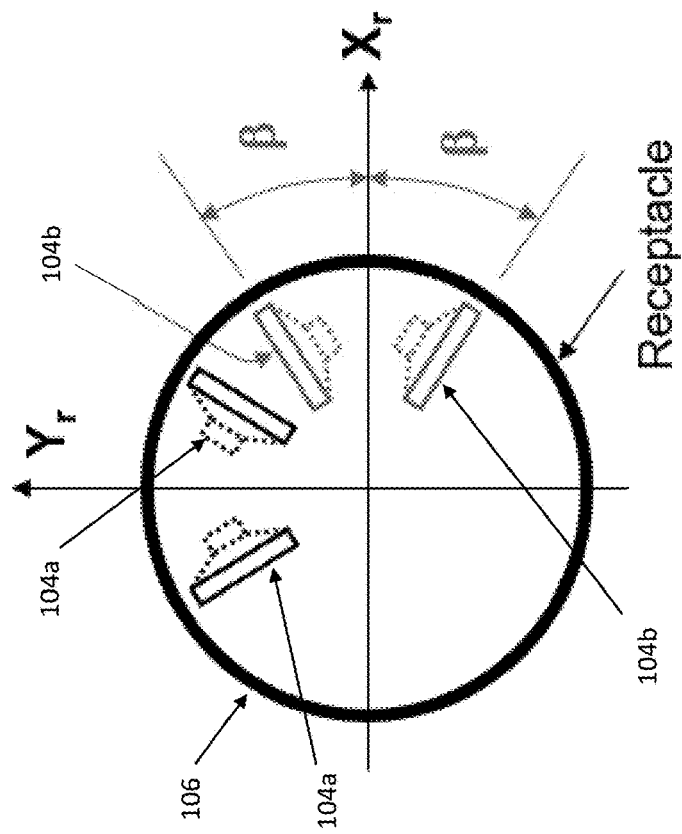
FIG. 8 illustrates a second sensor cavity pair for measurement of roll and pitch angle misalignment between the boom and receptacle.

If a second similar pair of cavity sensors 104b are added on the receptacle 106 and they are positioned symmetrically about the $X_r$-axis as shown in the frontal view of FIG. 8, the differential output of the second cavity sensor pair 104b to a polarized RF scanning pattern of the reference source 102 that is symmetric about the X-axis of the reference source becomes zero only if the roll angle as well as the pitch angle of the receptacle 106 relative to the boom are zero—as similarly indicated in the coordinate system of the reference source of FIG. 1. Therefore, the differential output of the second cavity sensor pair 104b will be zero only if the Y axis of the polarized RF scanning reference source, FIG. 1, is parallel with the $Y_r$ axis of the receptacle 106, FIG. 7, and the X-Z and $X_r$-$Z_r$ planes are in parallel, i.e., the receptacle 106 has zero roll and pitch angles relative to the boom but may have a yaw angle relative to the boom. The distance between the X-Z and $X_r$-$Z_r$ planes may also be non-zero.

It is noted that with the disclosed configuration of the polarized RF scanning reference source, it is possible to sequentially scan each sensor cavity pair 104a, 104b with scanning patterns that are symmetric about their axes of symmetry. Therefore, the sensory system concept can provide the desired measure of angular misalignment and distance between the boom and the receptacle with a single polarized RF scanning reference source.

The differential signal measurement from the above two cavity sensor pairs 104a, 104b provides a measure of pitch, yaw and roll measurement between the boom and the receptacle 106. The measurement of the signal strength at any one of the four cavity sensors of the two pairs 104a, 104b provides a measure of the distance between the boom and receptacle 106. It will be appreciated by those skilled in the art that since the distance between cavity sensors 104 and the polarized RF scanning reference source 102 when the boom and the receptacle 106 are fully engaged is known and that the magnitude of the signal at all four cavity sensors are known a priori, an accurate measurement of distance between the boom and the receptacle 102 can be readily calculated. In practice, however, one would only require a measure of distance between the boom and the receptacle 106 and its rate of change (rate of decrease in the distance) to close a control loop—manually or automatically—to achieve receptacle engagement for refueling. Known processors, such as a CPU are provided for the control loop management. Such controller can be provided on the UAV and/or the refueling aircraft. Auxiliary sensors (e.g., pressure, contact, proximity etc.) indicating full engagement can also be provided in such systems to ensure engagement between the boom and receptacle and for safety reasons.

In the above description, two pairs of identical sensor cavities 104a, 104b are used and they are illustrated as being located at the same radial distance from the origin of the provided coordinate system. In practice, however, each pair 104a, 104b may be located at a different radial distance at the available location on the receptacle 106. In addition, their axes of symmetry (axes X and Y in FIGS. 7 and 8) do not have to be orthogonal.

In the schematics of FIGS. 7 and 8, the pairs of symmetrically positioned cavity sensors 104a, 104b are shown to be constructed with two separate cavity sensors. Each pair may, however, be constructed as a single cavity with a single pick-up terminal as shown in FIGS. 9a and 9b, thereby significantly simplifying the sensor construction and its required electronics. FIG. 9b shows a frontal view of the integrated sensor pair 200 as it would have been viewed in the frontal views of FIGS. 7 and 8. The cross-sectional view about section A-A of the integrated sensor 200 is shown in FIG. 9a, also showing the location of a sensor pick-up probe 202. A second pick-up terminal is also provided (not shown) at a convenient position in either side cavities or other convenient locations for signal strength (relative distance) measurement as well as for communicating the measured signals back to a receiver provided on the boom side.

Referring now to FIG. 10, it is also possible to combine both pairs of cavity sensors into a single geometrical cavity with one or two pick-up probes (not shown) for full roll, pitch and yaw angle misalignment measurement. A separate second pick-up terminal can be provided for magnitude (distance) measurement as well as for communicating the measured signals back to a receiver provided on the boom side. A frontal view of such a roll, pitch and yaw misalignment measuring sensor cavity 300 is shown in FIG. 10. The use of one pick-up probe must be positioned to be sensitive to both pairs of differential cavity sensors, thereby requiring a higher transmitted power level for the same sensor output.

The use of a single but more complex cavity geometry is also a possibility, which should yield a significantly smaller roll, pitch and yaw misalignment and relative distance measuring sensor.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for remotely guiding a refueling boom of a tanker to engage with a fueling receptacle of an aircraft while the tanker and the aircraft are in flight, the method comprising:
    transmitting a polarized RF scanning pattern from one of the refueling boom and refueling receptacle;
    detecting the polarized RF scanning pattern at one or more cavity sensors disposed on the other of the refueling boom and the refueling receptacle; and
    controlling a position of the refueling boom relative to a position of the refueling receptacle based on the detected polarized RF scanning pattern at the one or more cavity sensors.

2. The method of claim 1, wherein the controlling comprises determining distance and roll, pitch and yaw angles of the refueling boom relative to the refueling receptacle.

3. The method of claim 1, wherein the controlling is a manual control by a user operating one or more of the refueling boom and refueling receptacle.

4. The method of claim 1, wherein the controlling is an automated control of a position of one or more of the refueling boom and refueling receptacle.

5. The method of claim 1, wherein the detecting comprises detecting the polarized RF scanning pattern at two pairs of individual cavity sensors.

6. The method of claim 1, wherein the detecting comprises detecting the polarized RF scanning pattern at two cavity sensors, each of the two cavity sensors having two cavities offset from each other.

7. The method of claim 1, wherein the detecting comprises detecting the polarized RF scanning pattern at a cavity sensor having four cavities offset from each other.

8. The method of claim 1, wherein the transmitting comprises transmitting the RF scanning pattern hidden in environmental noise.

9. The method of claim 1, further comprising, prior to the controlling, transmitting an output of the one or more cavity sensors to the other of the refueling boom and the refueling receptacle.

10. The method of claim 1, further comprising detecting engagement of the refueling boom to the refueling receptacle.

* * * * *